Feb. 12, 1952    L. A. MacDONALD ET AL    2,585,805
SINGLE PULSE GENERATOR
Filed Nov. 19, 1949    2 SHEETS—SHEET 1

INVENTORS
L. A. MACDONALD
R. B. MANCKE
BY
W. C. Middleton
ATTORNEY

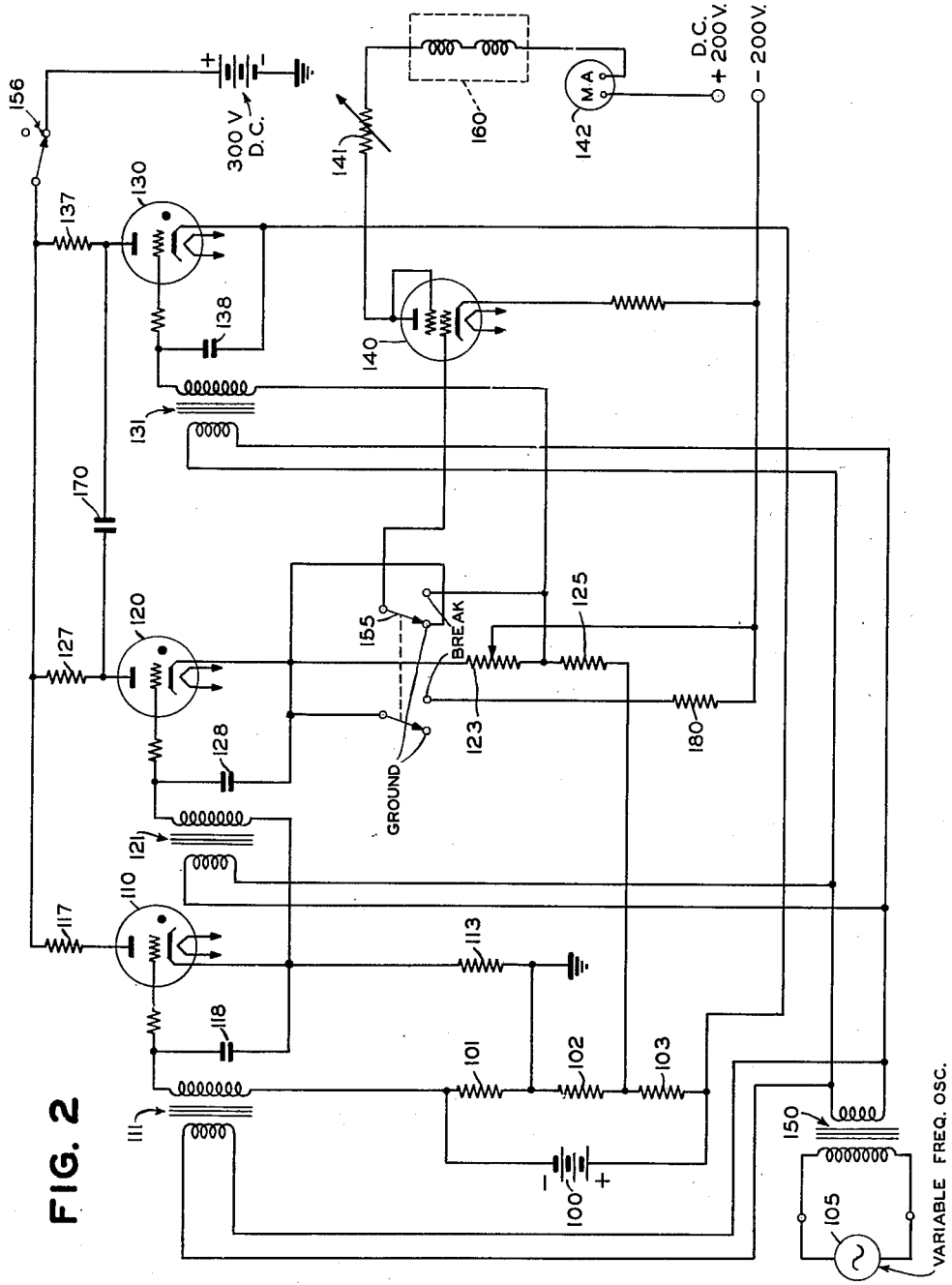

Patented Feb. 12, 1952

2,585,805

UNITED STATES PATENT OFFICE 2,585,805

SINGLE PULSE GENERATOR

Leslie A. MacDonald, Bellerose, and Richard Bell Mancke, Green Acres, N. Y., assignors to American District Telegraph Company, Jersey City, N. J., a corporation of New Jersey Application November 19, 1949, Serial No. 128,312

14 Claims. (Cl. 250—27)

This invention relates to improvements in single pulse generators, and more particularly to an electronic device for the generation of a single square-topped voltage or current pulse, the duration and magnitude of which can be easily controlled and measured.

An object of the present invention is to provide apparatus for generating a square-topped voltage or current pulse of relatively short duration.

Another object of the invention is to provide apparatus as before described for generating a pulse, the duration of which is approximately a fraction of a cycle of a control current utilized therein.

Another object of the invention is to provide apparatus for the foregoing purpose utilizing three gas-filled trigger tubes adapted to be fired in sequence with the duration of the firing of the second tube determining the time duration of the pulse generated.

Another object of the invention is to provide apparatus as just described in which means are provided in association with the trigger tubes for varying the time duration of conducting by the second tube.

Another object of the invention is to provide apparatus as before described in which use may be made of a pulse or pulses so generated for controlling the operation of a vacuum tube for test purposes.

A further object of the invention is to provide apparatus in which the time duration of the pulse can be varied by varying the frequency of the control current utilized in the apparatus.

Apparatus of the foregoing type for generating a pulse as previously described can be utilized for many purposes. For example, the speed of operation of a galvanometer type relay can readily be determined by one embodiment of the invention. The invention, however, can be used to provide a single sweep for observation of transients on a cathode ray oscilloscope or for the independent pulsing of a relay for momentary flow of large currents such as are used in electric welding.

In carrying out the foregoing and other objects of the invention, apparatus embodying the same incorporates three gas-filled trigger tubes to the grids of each of which are connected three secondaries of transformers which may have a common primary or separate primaries in turn energized by the secondary of a transformer connected to a current supply source. The plates of these three trigger tubes are supplied in parallel from a suitable source of direct current while separate sources of direct current can be used for providing biasing potential for the grids thereof. The three secondaries before mentioned are so phased that those connected to the grids of the first and third trigger tubes are in phase while that connected to the grid of the second tube is 180° out of phase relative to the other tubes. The second trigger tube has in its circuit a resistance or resistances across which is developed a potential while this tube is conducting. Depending on the length of time of tube conductivity, the potential so generated will in effect constitute a square-topped impulse. This potential can be utilized for various purposes, one purpose being described in detail hereinafter, in which potentials generated across two resistances or a split resistance are used to control the grid of a vacuum tube for test purposes. The potential generated across one of the resistances serves to so change the grid bias of a vacuum tube as to increase current flow through the tube, while the potential generated across the other resistance is of such nature that when applied to the grid of a vacuum tube, the tube in effect is rendered inoperative, in that current flow is reduced to zero. Separate controls can be provided in the grid circuit of each of the three trigger tubes for determining an initial grid bias thereof which can be changed independently for the various tubes to vary the duration of the generated pulse or pulses.

In another form of the invention the grid biasing of the trigger tubes can be maintained at a constant value for each tube while the durration of the generated pulses can be determined by varying the frequency of the supply source which supplies energy to the secondaries connected to the various trigger tube grids.

Other features, objects and advantages of the invention will become apparent by reference to the following detailed description of the accompanying drawing, wherein:

Fig. 2 is a similar diagram of another embodiment of the invention.

Figure 1:
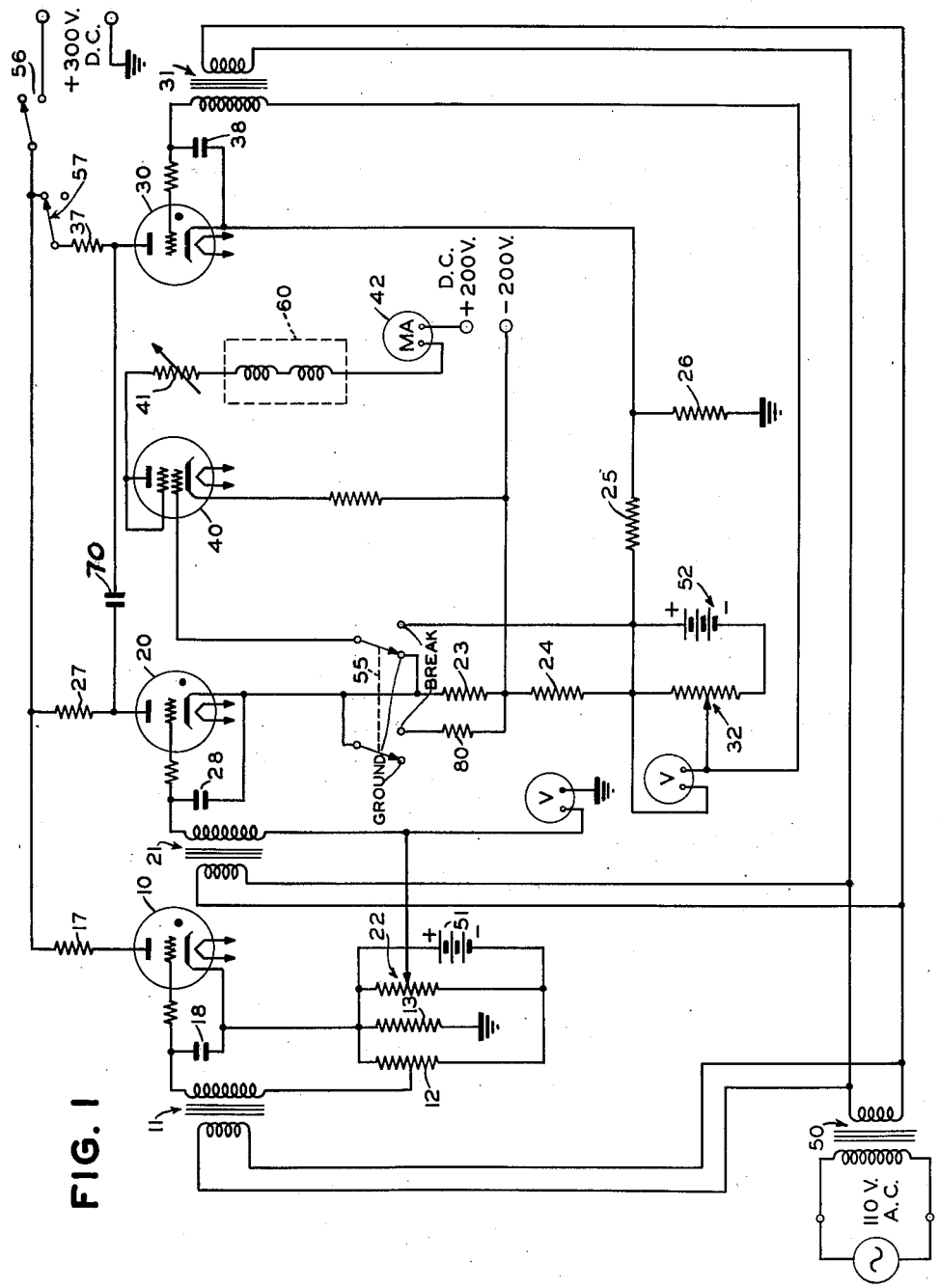
Fig. 1 is a circuit diagram of one embodiment of the invention.

Referring now to the drawings and particularly to Fig. 1, 10, 20 and 30 represent three gas-filled trigger tubes which have associated therewith the usual circuit elements. Any elements having a special function in connection with these trigger tubes will be described in detail in connection with a description of the operation of the apparatus. A vacuum tube is illustrated at 40, such tube having the customary cathode heater current supply and the like (not shown), and being provided with plate current from a source of potential indicated on the drawings separate from the source of potential, also indicated on the drawings, supplied to the plates of the three trigger tubes. Connected to the grid of the first trigger tube 10 is a secondary of a transformer 11, such transformer being of the iron core type. The secondary of a similar transformer 21 is connected to the grid of tube 20, while the secondary of another similar transformer 31 is connected to the grid of tube 30. These secondaries of the three transformers may have a common primary or may have independent primaries as shown in the drawings. In any event the secondaries are so arranged that the potential applied to the grid of tube 20 is 180° out of phase with the potentials applied to the grids of tubes 10 and 30. The single or plurality of primaries can be energized by the secondary of a transformer 50, the primary of which is supplied from a source of 60 cycle alternating current. A source of potential illustrated at 51 is utilized for providing biasing potential for the tubes 10 and 20 through potentiometers 12 and 22, respectively. The cathode of tube 10 is connected to ground through a resistor 13. The cathode of tube 20 is connected to ground through resistors 23 and 24 and also resistors 25 and 26. A source of potential 52 is utilized for supplying a grid bias to tube 30 through the potentiometer 32. Resistors 17, 27 and 37 are provided in the plate circuits of the respective tubes 10, 20, and 30.

An adjustable resistor 41 is provided in the plate circuit of the vacuum tube 40 while a milliammeter 42 is also connected in the plate circuit as shown. A double pole double throw switch 55 is connected to control the excitation of the control grid of tube 40 for purposes to be explained later. Switches 56 and 57 are likewise included in the mechanism.

The particular circuit arrangement illustrated in Fig. 1 has been designed for the purpose of testing galvanometer type relays which are adjusted to operate on a 40% reduction or a 40% increase in current flow therethrough from a normal value of, for example, 25 milliamperes. Such a relay is illustrated at 60 with the galvanometer type coils thereof being shown in the plate circuit of tube 40. If such a relay is used in an alarm circuit, it is supposed to operate upon a 40% increase in current which might occur if the alarm circuit became grounded. Similarly, the relay is supposed to operate upon a 40% reduction in current which might occur if the alarm circuit had a break therein. Consequently for test purposes the switch 55 is provided, such switch being movable from an upper or " ground" position to a lower or "break" position.

For purposes of explaining the operation of the apparatus, let it be assumed that the relay 60 is to be tested for operation under "ground" conditions in which case the switch will be in the position shown in Fig. 1. Under these conditions the switch 56 is open, current is supplied to the transformer 50 from a source of 110 volt 60 cycle alternating current and the potentiometers 12, 22 and 32 are adjusted to supply the desired grid potential to the grids of the respective tubes 10, 20 and 30. These potentials are determined in such manner as to cause the actuation or firing of the trigger tubes at predetermined points in the half cycles of potential applied to their transformer secondaries to obtain the desired results. Current in the vacuum tube circuit is then adjusted to the critical value, i. e., the value upon which the relay normally functions in this instance, 25 milliamperes.

With the apparatus in this condition the "ground" test of the relay can be made by the generation of a square-topped voltage impulse of definite duration. The test is made by closing the switch 56 whereupon the following occurs: the trigger tube 10 fires upon the first increase of transformer 11 voltage of proper polarity, the firing occurring when the voltage from the secondary combined with the biasing potential reaches the firing potential. When this tubes fires, it immediately passes current through the resistor 13 which produces a voltage of such polarity that when this voltage is impressed on the grid of tube 20, this grid becomes more positive by the amount of potential generated across resistor 13. Thus tube 20 acquires a new grid biasing which is more positive than that originally established by the potentiometer 22. Since the secondary of transformer 21 is 180° out of phase with the secondary of transformer 11, it follows that tube 20 will fire on the increase of potential supplied by the secondary of transformer 21 of the next half cycle with the firing occurring as soon as the transformer potential added to the new biasing potential reaches a critical value.

When tube 20 fires, a voltage is developed across resistors 23 and 24 and also across resistor 25. The potentials developed across the resistors 23 and 24 constitute the impulses which are to be used for test purposes and while these resistors are shown in the present installation as a separate character it will be readily apparent that a single resistor can be used for other test purposes. The potential developed across resistor 25 when combined with that supplied by potentiometer 32 serves to make more positive the biasing of the grid of tube 30 changing the biasing thereof to a new value which will permit the firing of this tube on the next half cycle of transformer energization, which will be 180° out of phase with that of transformer 21. The initial biasing of the grid of tube 30 is so arranged that this tube will not fire when tube 10 fires, such arrangement being necessary since the secondaries of these two tubes are in phase. As soon as tube 20 fires, a condenser 70 is charged at one polarity through resistor 37.

The potential developed across resistor 23 is applied to the grid of tube 40 through the switch 55 causing that tube to become more conductive and raising the current flow in the plate circuit from a value of 25 milliamperes to a value of, say, 60 milliamperes. If the relay 60 is in proper working order, such increase in current flow through the coil thereof will cause the relay to operate during the small time interval of application of potential from resistor 23 to the grid of tube 40. This time interval is controlled by operation of tube 30 which fires as soon as the third half cycle of potential from transformer 31 raises the biasing of the grid of tube 30 to the critical point. As soon as this tube 30 fires, it provides a low resistance path to ground for the condenser 70 permitting this condenser to discharge and then immediately become charged with an opposite polarity through resistor 27. The charging current passing through resistance 27 increases the voltage drop across this resistor to a large percentage of the available supply and this reduces the voltage across tube 20 to below the extinguishing value with the result that tube 20 stops conducting. Thus it will be seen that tube 20 conducts for less than a full cycle of the control source supplying transformer 50 with the result that the potentials developed across resistors 23 and 24 are in the nature of pulses of a duration less than one-sixtieth of a second. If the relay 60 is in proper working condition it will operate during the duration of the pulse supplied to the grid of tube 40 which increases the current flow through the relay coil for this time interval of less than one-sixtieth a second.

The passage of current through the tube 30 develops a voltage across resistor 26 which adds to the negative bias on tube 20 increasing the bias of this tube to a point at which recurring cycles of transformer 21 will not raise the potential of the grid of tube 20 to a value which would permit firing of the tube. Thus for each closing of the switch 56, tube 20 fires and conducts for a limited time. The above sequential operation produces a square-topped pulse of current through resistors 23 and 24 which exists from the time the tube 20 conducts until it is extinguished by the firing of tube 30 and the discharging of condenser 70. The time of firing of tubes 20 and 30 can be varied by changing the direct current biasing used, i. e., a higher negative value will permit these tubes to fire later and a smaller value will cause them to fire earlier. An independent variation of the biasing of grids 20 and 30 will therefore permit a pulse length variation of approximately 10% to 90% of the frequency wave length used on transformer 50.

The function of tube 10 is to assure that the instantaneous firing voltage in the grid of tube 20 will always increase from zero before tube 20 fires, thereby eliminating the possibility of closing switch 56 on the wrong part of a firing cycle. For consistency of operation condensers 18, 28 and 38 are provided in the trigger tube grid circuits for by-passing grid currents which would upset the biasing voltage on succeeding tubes and thus influence predetermined pulse times. Resistor 80 is used when switch 55 is in break position to compensate for the lack of vacuum tube grid current which flows when the switch 55 is in the ground position. This is necessary to keep the voltage across resistor 25 the same for both break and ground tests, consequently having the tube 30 fire at the same point for either test and thereby obtaining identical pulses through tube 20 for each test. The switch 57 is utilized to cut out the third trigger tube 30 when current adjustments are made in the first two trigger circuits for obtaining the proper current through tube 20 to effect the biasing which produces the aforestated current conditions in the vacuum circuit.

When a test has been made, switch 56 is opened, extinguishing tubes 10 and 30, and restoring the circuit to the initial conditions for the next pulse which will be identical if circuit conditions have not been changed. The pulse length can be measured by superimposing the pulse on an oscilloscope with a synchronized 60 cycle wave and determining by a direct comparison the percentage of the wave length occupied by the pulse.

A similar test for relay performance under "break" conditions can be made with switch 55 in the "break" position. When switch 56 is closed the same sequence of operation occurs with the exception that the biasing of the grid of tube 40 is made more negative by the potential developed across resistor 24, with the result that current flow through the coils of relay 60 drops to zero. If this relay is in proper working condition it will function with such current change.

Another method of obtaining pulse length variation (with respect to time) consists in maintaining the biasing voltages of the trigger tubes constant and varying the frequency of the voltage impressed on the main transformer. A circuit arrangement for accomplishing this result is shown in Fig. 2. In this arrangement use is made of three trigger tubes 110, 120 and 130, similar to the tubes 10, 20 and 30. In this arrangement, however, direct current biasing of these tubes is set at optimum values by means of a voltage dividing network supplied by battery 100. Resistor 101 of this network is effective in the grid circuit of tube 110 and bias for this tube is obtained by the drop across this resistor. Resistor 102 serves the same purpose for the grid of tube 120 while resistor 103 performs the same function for tube 130. Component parts of the circuit corresponding to parts of the Fig. 1, circuit have been given the same reference character stepped up 100.

Control voltage is applied to transformer 150 by a source 105 of alternating current which source may be in the nature of a variable frequency oscillator. Instead of utilizing two resistors 23 and 24 as in Fig. 1, use is made of a single resistor 123 which has an intermediate point tap.

The operation of this device is substantially the same as that previously described in that with the switch 155 in either ground or break position, a test of a relay 160 can be made by closing the switch 156. Tube 110 fires in the same manner as previously described, developing a voltage across resistor 113 which decreases the negative bias on tube 120 permitting this tube to fire on the next half cycle. Current through tube 120 produces the desired voltage across resistor 123 which voltage represents the flat-topped pulse in accordance with this invention. This voltage or portions thereof can be utilized to bias the grid of vacuum tube 140 either to increase the conductivity of this tube and hence the current flow through the coil of relay 160 or to decrease the tube's conductivity and hence reduce the current flow through the relay coil to zero. Such action depends upon the position of the switch 155. When the tube 120 is conducting, a voltage is also developed across resistor 125 which decreases the bias on tube 130 permitting it to fire on the next half cycle and also permitting the condenser 170 to discharge and become charged with opposite polarity extinguishing tube 120 in the manner described in connection with Fig. 1. Current from tube 130 develops a higher negative potential across resistor 102 which biases tube 120 sufficiently negative to prevent refiring of tube 120 on recurring cycles of the excitation voltage. As before, the net effect of the sequential firing of the three trigger tubes is a pulse, the length of which will, in this instance, be controlled by the frequency supplied by source 105. If the frequency is of a relatively low order, the pulse can be made of a longer time duration, while if the frequency is of a higher order, the time duration of the pulse is materially shortened. Several advantages are gained by this method, one of which is increased reliability in that the pulse length is independent of small changes in the magnitude of instantaneous grid voltage. Another resides in the fact that a finer variation in pulse length may be obtained.

From the foregoing it will be seen that the present invention in either form illustrated and described hereinbefore provides novel apparatus for the generation of a single pulse which can be utilized for various control purposes, one of which purposes, i. e., the testing of galvanometer type relays, has been illustrated. It will be understood that modifications can be made and that the invention is not to be limited to the illustrated and described use therefor but is to be limited only by the scope of the following claims.

What is claimed is:

1. A single pulse generator for generating a square-topped pulse comprising a gas-filled trigger tube, a source of constant potential space current for said tube, a source of alternating potential controlling the firing of said tube, means in the space current path of said tube for developing a potential while the tube is conducting, means for causing firing of said tube at a predetermined point in one half cycle of said alternating potential, and means for causing extinguishing of said tube at a predetermined point in the succeeding half cycle of said alternating potential.

2. A single pulse generator for generating a square-topped pulse comprising a gas-filled trigger tube, a source of constant potential space current for said tube, a source of alternating potential controlling the firing of said tube, means in the space current path of said tube for developing a potential while the tube is conducting, variable means for causing firing of said tube at a predetermined point in one half cycle of said alternating potential, and variable means for causing extinguishing of said tube at a predetermined point in the succeeding half cycle of said alternating potential, the duration of said developed potential depending on the points at which the tube fires and is extinguished.

3. A single pulse generator comprising a gas-filled trigger tube, a source of alternating potential controlling the firing of said tube, means in the space current path of said tube for developing a potential while the tube is conducting, means for causing firing of said tube at a predetermined point in one half cycle of said alternating potential, means for causing extinguishing of said tube at a predetermined point in the succeeding half cycle of said alternating potential, and a vacuum tube work circuit associated with said trigger tube with the biasing of said vacuum tube varied by said developed potential.

4. A single pulse generator comprising three gas-filled trigger tubes, a source of alternating potential controlling the firing of said tubes, means for so biasing said tubes that the same are fired at predetermined points in successive half cycles of said alternating potential, means in the space current path of the second of said tubes for developing a potential while the tube is conducting, and means associated with said third tube for extinguishing said second tube immediately after the third tube becomes conducting.

5. A single pulse generator comprising three gas-filled trigger tubes, a source of alternating potential controlling the firing of said tubes, means for so biasing said tubes that the same are fired at predetermined points in successive half cycles of said alternating potential, means in the space current path of the second of said tubes for developing a potential while the tube is conducting, means associated with said third tube for extinguishing said second tube immediately after the third tube becomes conducting, and a vacuum tube work circuit associated with said second trigger tube and having its grid bias varied by said developed potential.

6. A single pulse generator comprising three gas-filled trigger tubes, a source of alternating potential controlling the firing of said tubes, means for so biasing said tubes that the same are fired at predetermined points in successive half cycles of said alternating potential, means in the space current path of the second of said tubes for developing a potential while the tube is conducting, means associated with said third tube for extinguishing said second tube immediately after the third tube becomes conducting, means for varying the points in the respective half cycles of alternating potential at which said second and third trigger tube fire whereby the duration of said developed potential is varied.

7. A single pulse generator comprising three gas-filled trigger tubes, a source of alternating potential controlling the firing of said tubes, means for so biasing said tubes that the same are fired at predetermined points in successive half cycles of said alternating potential, means in the space current path of the second of said tubes for developing a potential while the tube is conducting, and means associated with said third tube for extinguishing said second tube immediately after the third tube becomes conducting, said source of alternating potential being variable as to frequency to vary the duration of said developed potential.

8. A single pulse generator comprising three gas-filled trigger tubes, a source of alternating potential controlling the firing of said tubes, means for so biasing said tubes that the same are fired at predetermined points in successive half cycles of said alternating potential, means in the space current path of the second of said tubes for developing a potential while the tube is conducting, means associated with said third tube for extinguishing said second tube immediately after the third tube becomes conducting, and means actuated by conducting of said third trigger tube for so biasing the grid of said second trigger tube as to prevent refiring thereof.

9. A single pulse generator comprising three gas-filled trigger tubes, a source of alternating potential controlling the firing of said tubes, variable biasing means for each of said tubes, means controlled by conducting of the first of said tubes for conditioning the second of said tubes, means controlled by conducting of the second of said tubes for conditioning the third of said tubes, said tubes being conditioned to fire on successive half cycles of said alternating potential, means in the space current path of the second of said tubes for developing a potential while the tube is conducting, and means associated with said third tube for extinguishing said second tube immediately after the third tube becomes conducting.

10. A single pulse generator comprising three gas-filled trigger tubes, a source of alternating potential controlling the firing of said tubes, variable biasing means for each of said tubes, means controlled by conducting of the first of said tubes for conditioning the second of said tubes, means controlled by conducting of the second of said tubes for conditioning the third of said tubes, said tubes being conditioned to fire on successive half cycles of said alternating potential, means in the space current path of the second of said tubes for developing a potential while the tube is conducting, means associated with said third tube for extinguishing said second tube immediately after the third tube becomes conducting, and a vacuum tube work circuit associated with said second trigger tube and having its grid bias varied by said developed potential.

11. A single pulse generator comprising three gas-filled trigger tubes, a source of alternating potential controlling the firing of said tubes, means for so biasing said tubes that the same are fired at predetermined points in successive half cycles of said alternating potential, biasing of the second tube being controlled by conducting of the first tube and biasing of the third tube being controlled by conducting of the second tube, means in the space current path of the second of said tubes for developing a potential while the tube is conducting, means associated with said third tube for extinguishing said second tube immediately after the third tube becomes conducting, means for varying the points in the respective half cycles of alternating potential at which said second and third trigger tubes fire whereby the duration of said developed potential is varied.

12. A single pulse generator comprising three gas-filled trigger tubes, a source of alternating potential controlling the firing of said tubes, means for so biasing said tubes that the same are fired at predetermined points in successive half cycles of said alternating potential, biasing of the second tube being controlled by conducting of the first tube and biasing of the third tube being controlled by conducting of the second tube, means in the space current path of the second of said tubes for developing a potential while the tube is conducting, and means associated with said third tube for extinguishing said second tube immediately after the third tube becomes conducting, said source of alternating potential being variable as to frequency to vary the duration of said developed potential.

13. A single pulse generator comprising three gas-filled trigger tubes, a source of alternating potential controlling the firing of said tubes, means for so biasing said tubes that the same are fired at predetermined points in successive half cycles of said alternating potential, biasing of the second tube being controlled by conducting of the first tube and biasing of the third tube being controlled by conducting of the second tube, means in the space current path of the second of said tubes for developing a potential while the tube is conducting, means associated with said third tube for extinguishing said second tube immediately after the third tube becomes conducting, said source of alternating potential being variable as to frequency to vary the duration of said developed potential, and a vacuum tube work circuit associated with said second trigger tube and having its grid bias varied by said developed potential.

14. A single pulse generator comprising three gas-filled trigger tubes, a source of alternating potential controlling the firing of said tubes, means for so biasing said tubes that the same are fired at predetermined points in successive half cycles of said alternating potential, biasing of the second tube being controlled by conducting of the first tube and biasing of the third tube being controlled by conducting of the second tube, means in the space current path of the second of said tubes for developing a potential while the tube is conducting, means associated with said third tube for extinguishing said second tube immediately after the third tube becomes conducting, and means actuated by conducting of said third trigger tube for so biasing the grid of said second trigger tube as to prevent refiring thereof.

LESLIE A. MacDONALD.
RICHARD BELL MANCKE.

REFERENCES CITED

The following references are of record in the file of this patent:

UNITED STATES PATENTS

| Number | Name | Date |
| --- | --- | --- |
| 2,332,325 | Levoy | Oct. 19, 1943 |
| 2,442,578 | Audier | June 1, 1948 |